United States Patent
Clark

(10) Patent No.: US 7,257,679 B2
(45) Date of Patent: Aug. 14, 2007

(54) SHARING MONITORED CACHE LINES ACROSS MULTIPLE CORES

(75) Inventor: Michael T. Clark, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 371 days.

(21) Appl. No.: 10/956,685

(22) Filed: Oct. 1, 2004

(65) Prior Publication Data

US 2006/0075060 A1    Apr. 6, 2006

(51) Int. Cl.
  G06F 12/00    (2006.01)
  G06F 13/00    (2006.01)
(52) U.S. Cl. ..................................... 711/141
(58) Field of Classification Search ............... 711/141
  See application file for complete search history.

(56) References Cited

U.S. PATENT DOCUMENTS

| | | | |
|---|---|---|---|
| 5,968,135 A | 10/1999 | Teramota et al. | |
| 6,721,856 B1 * | 4/2004 | Arimilli et al. | 711/146 |
| 2003/0126186 A1 | 7/2003 | Rodgers et al. | |
| 2003/0217115 A1 * | 11/2003 | Rowlands | 709/214 |
| 2004/0073905 A1 | 4/2004 | Emer et al. | |

OTHER PUBLICATIONS

Intel, "Prescott New Instructions Software Developer's Guide," Jan. 2004, 92 pages.
International Search Report in Application No. PCT/US2005/033819 Mailed Dec. 29, 2006.

* cited by examiner

Primary Examiner—Gary Portka
Assistant Examiner—Hamdy S Ahmed
(74) Attorney, Agent, or Firm—Lawrence J. Merkel; Meyertons, Hood, Kivlin, Kowert & Goetzel, P.C.

(57) ABSTRACT

In one embodiment, a system comprises a first processor core and a second processor core. The first processor core is configured to communicate an address range indication identifying an address range that the first processor core is monitoring for an update. The first processor core is configured to communicate the address range indication responsive to executing a first instruction defined to cause the first processor core to monitor the address range. Coupled to receive the address range indication, the second processor core is configured, responsive to executing a store operation that updates at least one byte in the address range, to signal the first processing core. Coupled to receive the signal from the second processor core, the first processor core is configured to exit a first state in which the first processor core is awaiting the update in the address range responsive to the signal.

27 Claims, 5 Drawing Sheets

SHARING MONITORED CACHE LINES ACROSS MULTIPLE CORES

BACKGROUND

1. Field of the Invention

This invention is related to processors and, more particularly, to the monitoring of cache lines for changes.

2. Description of the Related Art

Many application programs are written to interact with other application programs. Additionally, many application programs are written as multi-threaded applications. Multi-threaded applications have multiple code sequences (threads) designed to execute relatively independently. The threads (or applications) may communicate with each other in a variety of ways. For brevity, the term "thread" will be used in this discussion to refer to a code sequence from a multi-threaded application or to refer to an application as a whole, if the application is not itself multi-threaded.

Memory locations are often used to communicate between threads. For example, a memory location may be defined to store a semaphore used to control access to a larger area of memory, control access to another resource in the computer system such as a peripheral device, control the ability to execute a particular code sequence (often referred to as a "critical section"), etc. Any of the above will be referred to as a protected resource below. Typically, a thread may access the semaphore and check its state. If the state indicates that the thread may take control of the protected resource, the thread may change the semaphore state to indicate that the thread controls the protected resource. If the state indicates that another thread is in control of the protected resource, the thread may continue checking the semaphore until the state changes (e.g. by the other thread writing the semaphore to indicate that it is done with the protected resource). Memory locations may also be used to pass other messages between the threads (or to indicate that a message is available). If a given thread is awaiting a message from another thread, the given thread may continue checking the memory location until the memory location is written with a value indicating that the message is available. Many other examples exist in which a thread uses memory locations to communicate with another thread.

Typically, when a thread is checking a memory location for a desired state and does not find the desired state in the memory location, the thread enters a "spin loop" in which the thread repeatedly accesses the memory location checking for the desired state. When the memory location is eventually written with the desired state, the thread may exit the spin loop. While the thread is in the spin loop, the thread is not really accomplishing useful work. However, the processor that is executing the thread is consuming power executing the spin loop.

Some instruction set architectures have defined instructions that permit the processor to optimize for such situations, if the programmer uses the instructions in spin loops and other cases in which a thread is awaiting a desired state in a memory location. For example, the x86 instruction set (with the streaming single-instruction, multiple data extensions 3, or SSE3) defines a MONITOR/MWAIT instruction pair. The MONITOR instruction can be used to establish an address range that the processor is monitoring for an update (e.g. due to a store executed by another processor). The MWAIT instruction can be used to cause the processor to enter an "implementation-dependent optimized state" while waiting for the update. The processor exits the implementation-dependent optimized state in response to a store in the monitored address range (and also for certain interrupts and other reasons not related to the monitored address range). Typically, the processor is informed of the update through the normal coherency mechanism implemented in the processor.

SUMMARY

In one embodiment, a system comprises a first processor core and a second processor core. The first processor core is configured to communicate an address range indication identifying an address range that the first processor core is monitoring for an update. The first processor core is configured to communicate the address range indication responsive to executing a first instruction defined to cause the first processor core to monitor the address range for update. Coupled to receive the address range indication, the second processor core is configured, responsive to executing a store operation that updates at least one byte in the address range, to signal the first processing core. Coupled to receive the signal from the second processor core, the first processor core is configured to exit a first state responsive to the signal, wherein the first state is a state in which the first processor core is awaiting the update in the address range.

In another embodiment, a method is contemplated. The method comprises communicating an address range indication identifying an address range that a first processor core is monitoring for an update from the first processor core to a second processor core, wherein the communicating is responsive to executing a first instruction defined to cause the first processor core to monitor the address range for update; executing a store operation that updates at least one byte in the address range in the second processor core; responsive to the store operation, signalling the first processor core; and exiting a first state in the first processor core, in which the first processor core is awaiting the update in the address range, responsive to the signalling.

In yet another embodiment, a processor core comprising a monitor unit is contemplated. The processor core is configured to monitor an address range for update responsive to a first instruction. The processor core is configured to enter a first state to await the update to the address range. The monitor unit is configured to communicate an address range indication identifying the address range to a second processor core responsive to executing the first instruction, and is configured to receive a signal from the second processor core indicating that the second processor core is updating at least one byte in the address range. The processor core is configured to exit the first state responsive to the signal.

BRIEF DESCRIPTION OF THE DRAWINGS

The following detailed description makes reference to the accompanying drawings, which are now briefly described.

Figure 1:
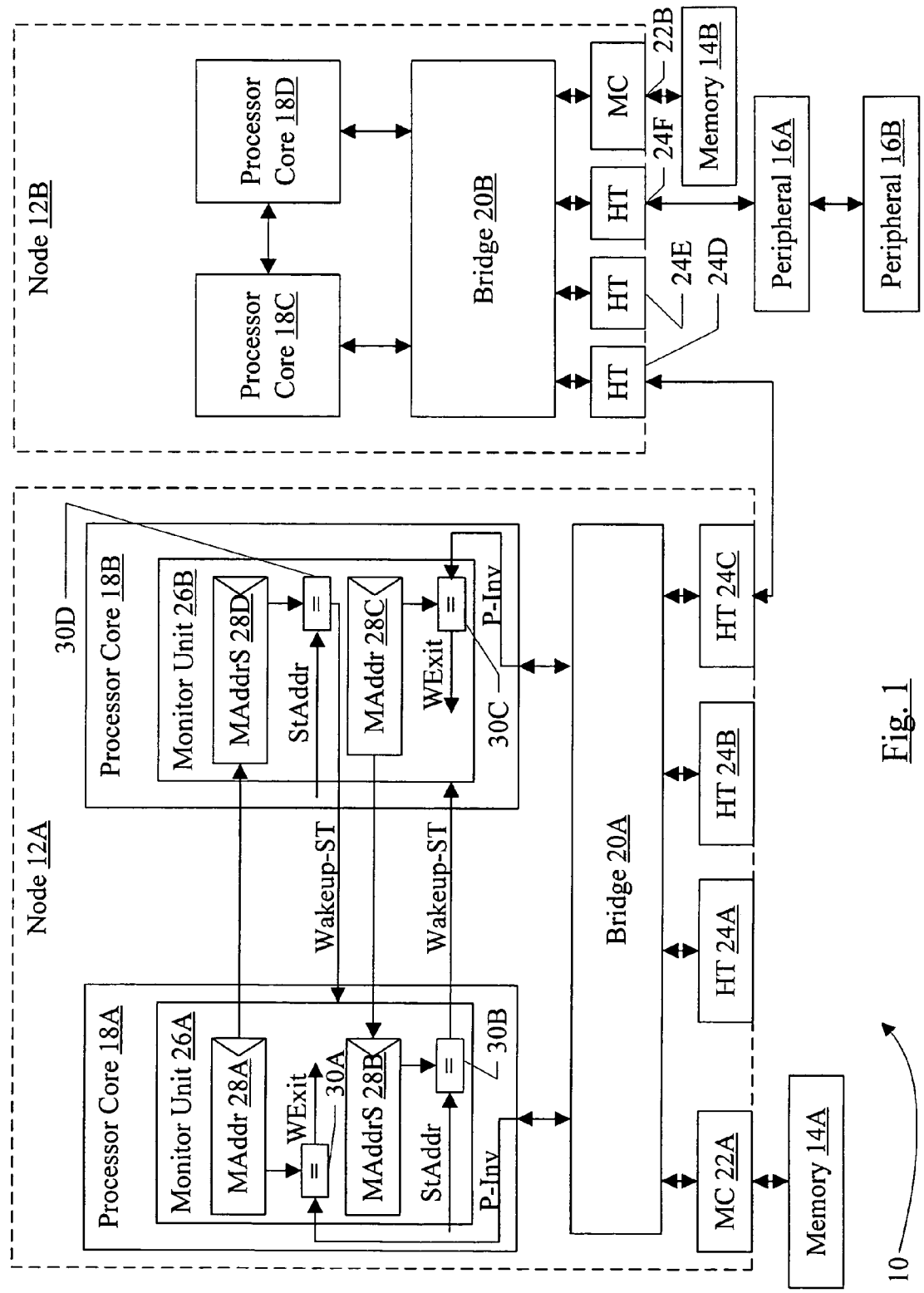
FIG. 1 is a block diagram of one embodiment of a computer system including a plurality of processor cores.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Exemplary embodiments are described below that include processor cores implementing the x86 instruction set architecture (including at least the SSE3 extensions that define the MONITOR and MWAIT instructions, and may include other extensions such as the AMD64™ extensions or any other extensions). Other embodiments may implement any instruction set architecture and may include one or more instructions defined to establish an address range to be monitored (e.g. a cache line, or any other address range) and defined to cause the processor core to enter a state awaiting an update to at least one byte within the monitored address range. That is, responsive to executing the instruction or instructions, the processor core may monitor the address range and enter the state awaiting the update within the monitored address range. The MONITOR and MWAIT instructions will be used as an example of such instructions. For convenience in the specification, the MONITOR instruction will be referred to as the monitor instruction (no capitalization) and the MWAIT instruction will be referred to as the MWait instruction (only the M and W capitalized).

Turning now to FIG. 1, a block diagram of one embodiment of a computer system 10 is shown. In the illustrated embodiment, the computer system 10 includes nodes 12A-12B, memories 14A-14B, and peripheral devices 16A-16B. The nodes 12A-12B are coupled, and the node 12B is coupled to the peripheral devices 16A-16B. Each of the nodes 12A-12B are coupled to respective memories 14A-14B. The node 12A comprises processor cores 18A-18B coupled to a bridge 20A which is further coupled to a memory controller 22A and a plurality of HyperTransport™ (HT) interface circuits 24A-24C. The node 12B similarly comprises processor cores 18C-18D coupled to a bridge 20B which is further coupled to a memory controller 22B and a plurality of HyperTransport™ (HT) interface circuits 24D-24F. The HT circuits 24C-24D are coupled (via an HT interface, in this embodiment) and the HT circuit 24F is coupled to the peripheral device 16A, which is coupled to the peripheral device 16B in a daisy-chain configuration (using HT interfaces, in this embodiment). The memory controllers 22A-22B are coupled to the respective memories 14A-14B.

Additional details of one embodiment of the processor cores 18A-18B are shown in FIG. 1. The processor cores 18C-18D may be similar. In the illustrated embodiment, the processor core 18A includes a monitor unit 26A that comprises registers 28A-28B and comparators 30A-30B The register 28A is coupled to the comparator 30A which is further coupled to receive an address of an invalidating probe (P-Inv) from the interface to the bridge 20A. The register 28B is coupled to the comparator 30B which is further coupled to receive a store address (StAddr) from the processor core 18A. The output of the comparator 30B is coupled as a Wakeup-ST signal to the monitor unit 26B. The monitor unit 26B, in the illustrated embodiment, comprises registers 28C-28D and comparators 30C-30D similar to registers 28A-28B and comparators 30A-30B, respectively. The output of the comparator 30D is coupled as a Wakeup-ST signal to the monitor unit 26A. The register 28A is coupled to the register 28D and the register 28B is coupled to the register 28C.

Each of the processor cores 18A-18D may be configured to monitor an address range responsive to executing a monitor instruction. Additionally, the monitoring processor core 18A-18D may communicate an address range indication identifying the monitored address range to at least one other processor core 18A-18D (the "receiving processor core"). For example, in the illustrated embodiment, the monitoring processor core 18A-18D may communicate the address range indication to the other processor core 18A-18D in the same node 12A-12B. That is, the processor core 18A may communicate its address range indication to the processor core 18B (and vice versa) and the processor core 18C may communicate its address range indication to the processor core 18D (and vice versa). The receiving processor core 18A-18D may monitor for store operations to the address range that the receiving processor core 18A-18D performs in response to instruction execution. If such a store is detected, the receiving processor core 18A-18D may signal the monitoring processor core 18A-18D. For example, in the illustrated embodiment, the receiving processor core 18A-18D may assert the Wakeup-ST signal to the monitoring processor core 18A-18D. The monitoring processor core 18A-18D may exit the state that it entered via execution of the MWait instruction (if still in the state) responsive to the signal. In some embodiments, the receiving processor core signalling the detection of a store operation to the monitored address range may cause the monitoring processor core to exit the state more rapidly than would occur through the transmission of coherency communications through the normal communication interfaces.

Generally, the address range indication may be any value or values that define the monitored address range. For example, the address range may correspond to a block of contiguous bytes in memory. If the size of the block is fixed (e.g. a cache line, or a fixed number of cache lines, or a portion of a cache line), a base address of the block may be used. Similarly, if the size is variable but each of the processor cores 18A-18D is programmed to the same size, a base address may be used. In other embodiments, a base address and size or a base address and an ending address may identify the address range. For the remainder of this discussion, an embodiment in which a cache line is the size of the address range and the base address of the cache line is used as an address range indication will be used as an example. However, other embodiments may use any size address range and any corresponding address range indication.

The processor cores 18A-18B are illustrated in more detail in FIG. 1 to include the monitor units 26A-26B. Operation of the monitor unit 26A (and its registers 28A-28B and comparators 30A-30B) will be discussed in more detail, and operation of the monitor unit 26B may be similar.

The register 28A stores the address being monitored by the monitor unit 28A (MAddr). That is, the processor core 18A may write the register 28A with the address generated during execution of the monitor instruction by the processor core 18A. The MAddr is compared, via comparator 30A, to the address supplied to the processor core 18A with any communications that indicate update of the cache line indicated by the address. For example, in the illustrated embodiment, an invalidating probe (P-Inv) may be an indication of update. Generally, a probe is a communication used in coherency schemes to determine if the receiver of the probe has a cache line identified by the probe and to specify a state change for the cache line, if found (and possibly requiring that a modified cache line be returned to memory or the requestor). An invalidating probe specifies a state change of the cache line to invalid. Invalidating probes may be used in certain coherency schemes to invalidate cache lines in other caches that are being updated by a source device (e.g. processor, peripheral device, etc.). Other indications may be used. For example, write operations may be used in addition to or instead of invalidating probes. As another example, a read operation that indicates that the source of the read operation is going to modify the cache line may be an indication of update. Such read operations are often referred to as read with intent to modify operations, read modify operations, or read exclusive operations. In other embodiments, the MAddr may be compared to the addresses of any probes received by the processor core 18A, even if the probes are not indicative of an update. Such comparisons may cause the processor core 18A to exit the MWait state and read the cache line again (via instructions that follow the MWait instruction in the instruction sequence). In this fashion, software may ensure that the source of an access to the monitored cache line that caused the probe does not receive an exclusive copy of the cache line (which it would then be able to subsequently update without causing an invalidating probe).

If a match is detected by the comparator 30A, the monitor unit 26A may cause the processor core 18A to exit the state entered in response to the MWait instruction (e.g. via assertion of the WExit signal in FIG. 1). The processor core 18A may continue executing instructions subsequent to the MWait instruction. Software may include instructions subsequent to the MWait instruction to check the value within the cache line being monitored and, if the desired state is not found, branch back to the monitor instruction/MWait instruction to re-enter the state.

The monitor unit 26A may also communicate the address of the monitored cache line to the monitor unit 26B. In the illustrated embodiment, the monitor unit 26A may output the address from the register 28A directly to the monitor unit 26B. In other embodiments, the address may be communicated in other fashions. For example, the address may be transmitted over the interface to the bridge 20A (e.g. as a communication coded to indicate that the address is a monitored address) and the bridge 20A may route the communication to the processor core 18B.

In a similar fashion, the monitor unit 26A may receive the address being monitored by the monitor unit 26B. In the illustrated embodiment, the monitor unit 26A includes the register 26B to store a shadow copy of the monitored address from the monitor unit 26B (MAddrS in FIG. 1). The monitor unit 26A compares the MAddrS address to the addresses of store operations performed by the processor core 18A (StAddr in FIG. 1). If a store to the cache line indicated by the MAddrS address is detected (comparator 30B), the monitor unit 26A may assert the Wakeup-ST signal to the monitor unit 26B. In other embodiments, the monitor unit 26B may continuously supply the output of the register 28C to the monitor unit 26A, and the register 28B may not be implemented in such embodiments.

The monitor unit 26B may similarly generate the Wakeup-ST signal for the monitor unit 26A. In response to receiving an asserted Wakeup-ST signal from the monitor unit 26B, the monitor unit 26A is configured to exit the state entered in response to the MWait instruction, similar to detecting an invalidating probe to the cache line.

Generally, the processor core 18A may use the interface to bridge 20A to communicate with other components of the computer system 10 (e.g. peripheral devices 16A-16B, processor cores 18B-18D with the exception of the communication of the shadow copies of the monitored address and the Wakeup-ST signals with processor core 18B mentioned above, the memory controllers 22A-22B, etc.). The interface may be designed in any desired fashion. Cache coherent communication may be defined for the interface, as mentioned above. In one embodiment, communication on the interfaces between the bridge 20A and the processor cores 18A-18B may be in the form of packets similar to those used on the HT interfaces. In other embodiments, any desired communication may be used (e.g. transactions on a bus interface). In other embodiments, the processor cores 18A-18B may share an interface to the bridge 20A (e.g. a shared bus interface).

The bridge 20A may generally be configured to receive communications from the processor cores 18A-18B and the HT circuits 24A-24C and to route those communications to the processor cores 18A-18B, the HT circuits 24A-24C, and the memory controller 22A dependent upon the communication type, the address in the communication, etc. In one embodiment, the bridge 20A includes a system request queue (SRQ) into which received communications are written by the bridge 20A. The bridge 20A may schedule communications from the SRQ for routing to the destination or destinations among the processor cores 18A-18B, the HT circuits 24A-24C, and the memory controller 22A. The bridge 20B may be similar with regard to the processor cores 18C-18D, the HT circuits 24D-24F, and the memory controller 22B.

The memories 14A-14B may comprise any suitable memory devices. For example, a memory 14A-14B may comprise one or more RAMBUS DRAMs (RDRAMs), synchronous DRAMs (SDRAMs), double data rate (DDR) SDRAM, static RAM, etc. The address space of the computer system 10 may be divided among memories 14A-14B. Each node 12A-12B may include a memory map (e.g. in the bridge 20A) used to determine which addresses are mapped to which memories 14A-14B, and hence to which node 12A-12B a memory request for a particular address should be routed. The memory controllers 22A-22B may comprise control circuitry for interfacing to the memories 14A-14B. Additionally, the memory controllers 22A-22B may include request queues for queuing memory requests, etc.

The HT circuits 24A-24F may comprise a variety of buffers and control circuitry for receiving packets from an HT link and for transmitting packets upon an HT link. The HT interface comprises unidirectional links for transmitting packets. Each HT circuit 24A-24F may be coupled to two such links (one for transmitting and one for receiving). A given HT interface may be operated in a cache coherent fashion (e.g. between nodes 12A-12B) or in a non-coherent fashion (e.g. to/from peripheral devices 16A-16B). In the illustrated embodiment, the HT circuits 24C and 24D are coupled via coherent HT links for communicating between the nodes 12A-12B. The HT circuits 24A-24B and 24E are not in use, and the HT circuit 24F is coupled via non-coherent links to the peripheral devices 16A-16B.

The peripheral devices 16A-16B may be any type of peripheral devices. For example, the peripheral devices 16A-16B may include devices for communicating with another computer system to which the devices may be coupled (e.g. network interface cards or modems). Furthermore, the peripheral devices 16A-16B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "peripheral device" is intended to encompass input/output (I/O) devices.

In one embodiment, each of the nodes 12A-12B may be a single integrated circuit chip comprising the circuitry shown therein in FIG. 1. That is, each node 12A-12B may be a chip multiprocessor (CMP). Other embodiments may implement the nodes 12A-12B as two or more separate integrated circuits, as desired. Any level of integration or discrete components may be used.

Generally, a processor core 18A-18D may comprise circuitry that is designed to execute instructions defined in a given instruction set architecture. That is, the processor core circuitry may be configured to fetch, decode, execute, and store results of the instructions defined in the instruction set architecture. The processor cores 18A-18D may comprise any desired configurations, including superpipelined, superscalar, or combinations thereof. Other configurations may include scalar, pipelined, non-pipelined, etc. Various embodiments may employ out of order speculative execution or in order execution. The processor core may include microcoding for one or more instructions or other functions, in combination with any of the above constructions. Various embodiments may implement a variety of other design features such as caches, translation lookaside buffers (TLBs), etc. In a CMP embodiments, the processor cores within a given node 12A-12B may comprise circuitry included in the CMP. In other embodiments, the processor cores 18A-18D may each comprise a discrete integrated circuit.

As mentioned above, the processor cores 18A-18D may be configured to perform store operations during instruction execution. In various embodiments, store operations may be the result of explicit store instructions, may be implicit in other instructions that have a memory operand as a destination, or both. Generally, a store operation may be an update of one or more bytes in memory locations specified by an address associated with the store operation.

Various signals have been mentioned above as being asserted, deasserted, generated, etc. In general, a signal may be any indication transmitted by a source to a receiver. A signal may comprise one or more signal lines that may be asserted or deasserted, for example.

It is noted that, while the present embodiment uses the HT interface for communication between nodes and between a node and peripheral devices, other embodiments may use any desired interface or interfaces for either communication. For example, other packet based interfaces may be used, bus interfaces may be used, various standard peripheral interfaces may be used (e.g. peripheral component interconnect (PCI), PCI express, etc.), etc.

It is noted that, while the computer system 10 illustrated in FIG. 1 comprises two nodes 12A-12B, other embodiments may implement one node or more than two nodes. Similarly, each node 12A-12B may include two or more processor cores, in various embodiments. In some embodiments, the monitor units 26 in each processor core within a node may be configured to receive the addresses of monitored cache lines from each other processor core in the same node and may be configured to monitor for store operations to each of the monitored cache lines. In other embodiments, subsets of the processor cores may be identified and may be configured to detect store operations to each others monitored cache lines. Various embodiments of the computer system 10 may include different numbers of HT interfaces per node 12A-12B, differing numbers of peripheral devices coupled to one or more of the nodes, etc.

Figure 2:
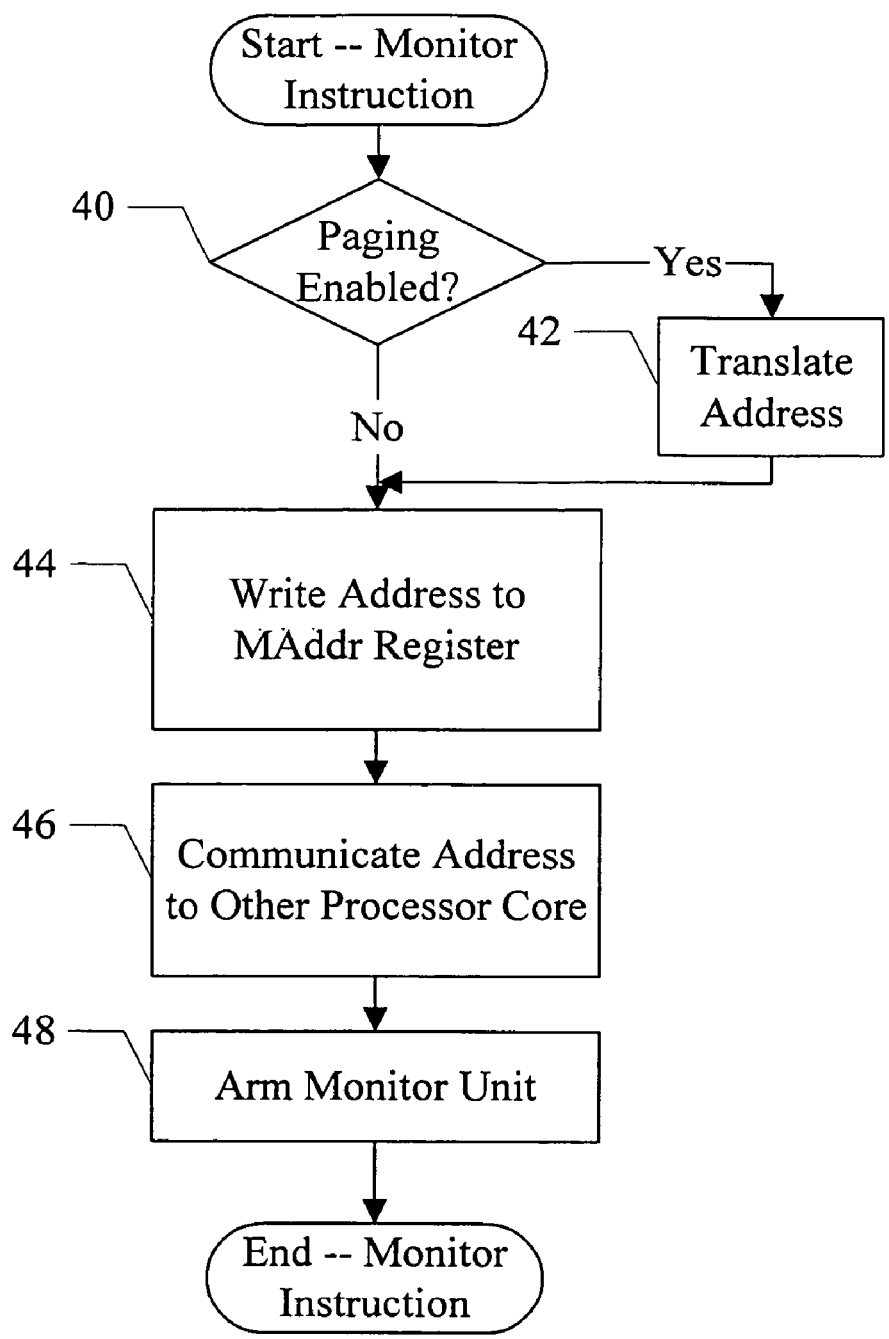
FIG. 2 is a flowchart illustrating operation of one embodiment of a processor core during execution of a monitor instruction.
Figure 3:
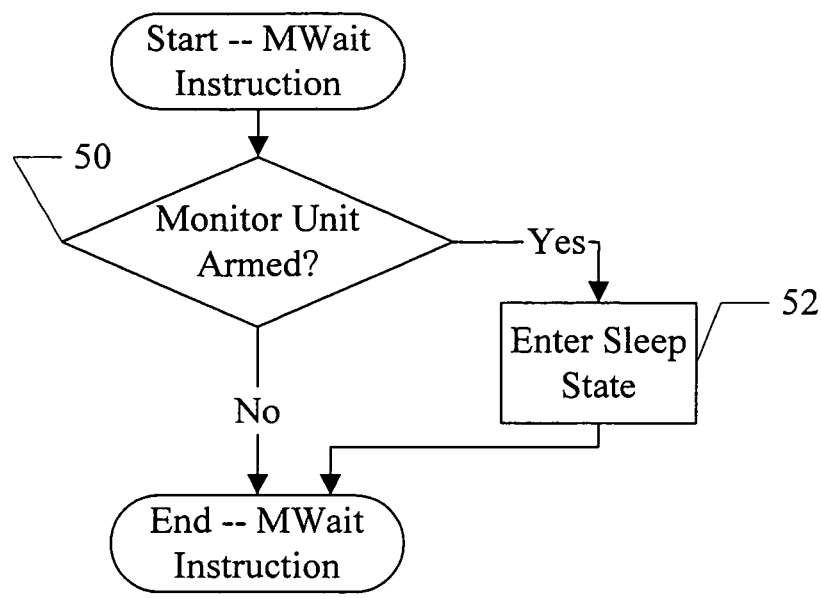
FIG. 3 is a flowchart illustrating operation of one embodiment of a processor core during execution of an MWait instruction.
Figure 4:
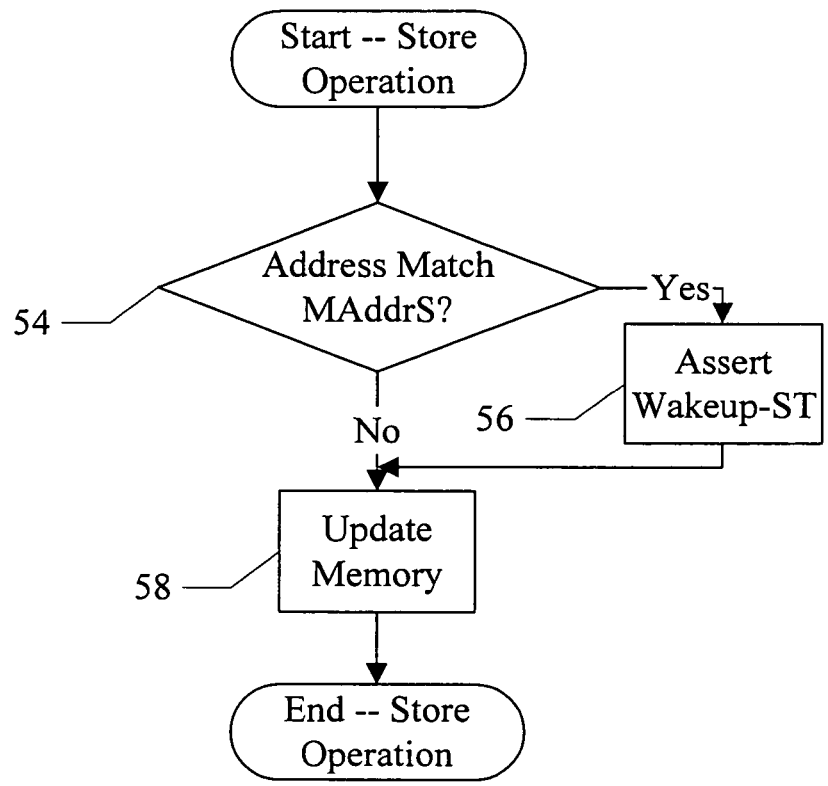
FIG. 4 is a flowchart illustrating operation of one embodiment of a processor core during execution of a store instruction.
Figure 5:
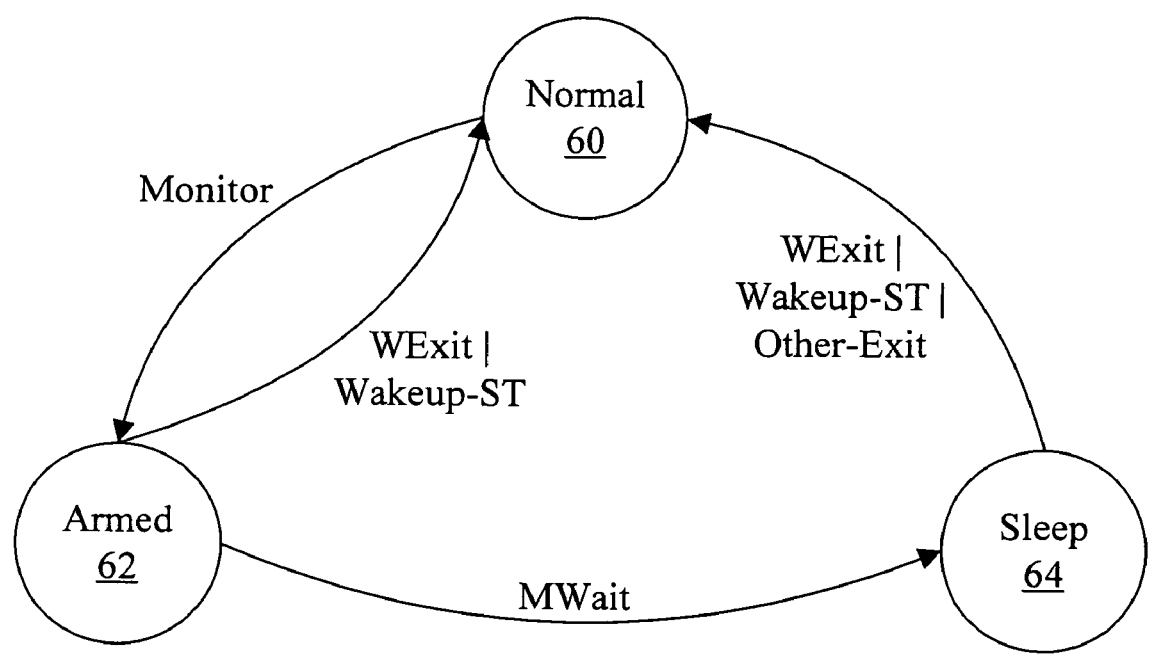
FIG. 5 is a state machine illustrating operation of one embodiment of a processor core for entering a low power state while awaiting update of a cache line.

FIGS. 2-4 are flowcharts illustrating operation of one embodiment of a processor core 18A-18D to execute various instructions, and FIG. 5 is a state machine illustrating exemplary states of one embodiment of a processor core 18A-18D. In the discussion of FIGS. 2-5 below, the processor core 18A will be used as an example, but the processor cores 18B-18D are similar. For each instruction illustrated via FIGS. 2-4, the processor core 18A-18D executing the instruction may perform other operations (e.g. checking for exceptions, etc.) not shown in FIGS. 2-4 for simplicity and brevity in the drawings.

Turning now to FIG. 2, a flowchart is shown illustrating operation of one embodiment of the processor core 18A for executing a monitor instruction. The processor core 18A may comprise circuitry and/or microcode to perform the operation shown in FIG. 2. While the blocks shown in FIG. 2 are illustrated in a particular order for ease of understanding, any order may be used. Furthermore, blocks may be performed in parallel by combinatorial logic in the processor core 18A. Blocks may be pipelined over multiple clock cycles and/or the operation illustrated in the flowchart may be pipelined over multiple clock cycles, as desired, in various embodiments.

In the present embodiment, the address of the cache line to be monitored is defined to be in the EAX register (or RAX register, if the AMD64™ extension is implemented by the processor core 18A). In other embodiments, the processor core 18A may add two or more operands to generate the address of the cache line to be monitored. In some embodiments, if protected mode is enabled, the contents of the EAX register are an offset to be added to a segment base address defined in one of the segment registers to for a linear address. In other embodiments, the segment base address may be zero and the contents of the EAX register maybe equal to the linear address. If paging is enabled (decision block 40, "yes" leg), the address is a virtual address (e.g. linear address) that is to be translated through the paging mechanism to a physical address (block 42). The physical address may be the address monitored by the monitor unit 26A. In either case, the processor core 18A may write the address to be monitored to the MAddr register 28A in the monitor unit 26A (block 44). Additionally, the processor core 18A may communicate the address to the other processor core 18B (block 46). In other embodiments, the processor core 18A may communicate the address to more than one other processor core. The processor core 18A may also "arm" the monitor unit 26A (block 48). Generally, arming the monitor unit 26A may refer to placing the monitor unit 26A in a state that indicates that a monitor instruction has been executed (and thus an address to be monitored has been established in the monitor unit 26A). The armed state may be used to determine the response to the MWait instruction, as described in more detail below.

FIG. 3 is a flowchart illustrating operation of one embodiment of the processor core 18A for executing an MWait instruction. The processor core 18A may comprise circuitry and/or microcode to perform the operation shown in FIG. 3. While the blocks shown in FIG. 3 are illustrated in a particular order for ease of understanding, any order may be used. Furthermore, blocks may be performed in parallel by combinatorial logic in the processor core 18A. Blocks may be pipelined over multiple clock cycles and/or the operation illustrated in the flowchart may be pipelined over multiple clock cycles, as desired, in various embodiments.

If the monitor unit 26A is armed via previous execution of a monitor instruction (and there has been no detection of a subsequent update to the cache line—decision block 50, "yes" leg), the processor core 18A may enter a sleep state in this embodiment (block 52). Various states may be entered in response to the MWait instruction in different embodiments (e.g. the implementation-dependent optimized state mentioned previously). The sleep state may be a power conservation state in which the processor core 18A attempts to reduce its power consumption. The processor core 18A may cease executing instructions in the sleep state, in some embodiments. In various embodiments, the sleep state may include one or more of the following for reducing power consumption: reducing the clock frequency at which the processor core 18A is operating, gating clocks to various circuitry, turning off the clock, turning off a phase lock loop or other clock generation circuitry, powering down the processor core (except for the monitor unit), etc. The sleep state may be any of the stop grant states used in various implementations of power management in personal computer systems, for example. In other embodiments, other states may be used. For example, if the processor core 18A implements multi-threading facilities, the processor core 18A may switch to executing another thread upon execution of the MWait instruction until an update to the monitored cache line is detected.

If the monitor unit 26A is not armed (decision block 50, "no" leg), then the processor core 18A may not take any action with respect to the MWait instruction and may continue execution with the next instruction subsequent to the MWait instruction. The monitor unit 26A may not be armed if a monitor instruction was not executed prior the MWait instruction (although other instructions may be executed between the monitor instruction and the MWait instruction). Additionally, the monitor unit 26A may not be armed if the monitor instruction was previously executed but, before execution of the MWait instruction, an update of the monitored cache line was detected.

Turning next to FIG. 4, a flowchart is shown illustrating operation of one embodiment of the processor core 18A for performing a store operation. The processor core 18A may comprise circuitry and/or microcode to perform the operation shown in FIG. 4. While the blocks shown in FIG. 4 are illustrated in a particular order for ease of understanding, any order may be used. Furthermore, blocks may be performed in parallel by combinatorial logic in the processor core 18A. Blocks may be pipelined over multiple clock cycles and/or the operation illustrated in the flowchart may be pipelined over multiple clock cycles, as desired, in various embodiments.

The monitor unit 26A compares the address of the store operation to the address in the register 28B (the register storing the MAddrS address). If the store address matches the MAddrS address (decision block 54, "yes" leg), the monitor unit 26A may assert the Wakeup-ST signal to the processor core 18B (block 56). In either case, the processor core 18A may complete the store by updating memory (block 58). The memory may be updated in cache, in embodiments of the processor core 18A that implement a cache. Additionally, cache coherency may be maintained according to the coherency protocol implemented in the computer system 10.

FIG. 5 is a state machine diagram illustrating exemplary states of the processor core 18A related to the implementation of the monitor/MWait instructions. Other states for other purposes may be implemented by various embodiments of the processor core 18A. Illustrated in FIG. 5 are a normal state 60, an armed state 62, and a sleep state 64.

The normal state 60 may be the state of the processor core 18A in which instructions are being executed and no monitoring of cache lines (as defined for the monitor/MWait instructions) is being performed. The armed state 62 may be a state in which the monitor unit 26A has been updated with an address of a cache line to be monitored (via execution of the monitor instruction), and is awaiting the subsequent execution of the MWait instruction. The sleep state 64 is a power conservation state as mentioned above. Other states may be used in place of the sleep state 64 in other embodiments, as mentioned above.

If the processor core 18A is in the normal state 60 and the monitor instruction is executed, the state machine transitions to the armed state 62. In the armed state 62, if either an invalidating probe to the monitored cache line is detected (WExit asserted) or an asserted Wakeup-ST signal is received by the monitor unit 26A, the state machine transitions back to the normal state 60. This transition represents a case in which an update to the monitored cache line occurs prior to the MWait instruction being executed. On the other hand, if the MWait instruction is executed while the state machine is in the armed state 62, the state machine transitions to the sleep state 64. The state machine may transition from the sleep state 64 to the normal state 60 in response to detecting an invalidating probe to the monitored cache line (WExit), an assertion of the Wakeup-ST signal to the monitor unit 26A (Wakeup-ST), or any other exit conditions defined for the MWait instruction and/or the processor core implementation (Other-Exit). Other exit conditions may vary from embodiment to embodiment, but may include the delivery of an external interrupt to the processor core 18A, a reset of the processor core 18A, etc.

Figure 6:
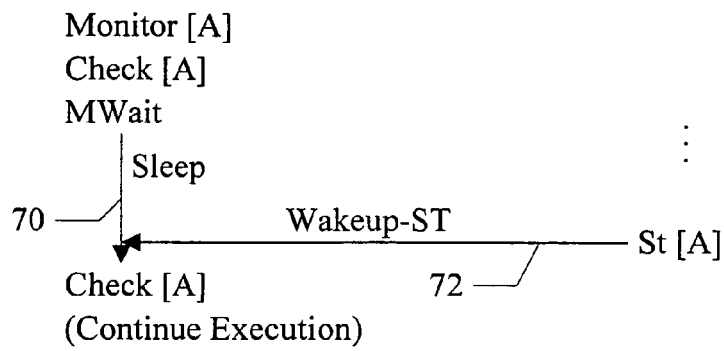
FIG. 6 is an example illustrating operation of one embodiment of a processor core when a processor core in the same node updates the monitored cache line.

FIG. 6 is an example illustrating operation of the processor core 18A when a processor core in the same node 12A (e.g. the processor core 18B) updates the monitored cache line. Code being executed by the processor core 18A is shown beneath the heading (in bold) "Processor Core 18A, Node 12A". Code being executed by the processor core 18B is shown beneath the heading (in bold) "Processor core 18B, Node 12A". The processor core 18A executes the monitor instruction, establishing the address "A" of a cache line for monitoring and arming the monitor unit 26A. The code then includes a check for the address A (denoted as "Check [A]" in FIG. 6). The check may include reading a memory location within the monitored cache line and comparing it to a desired state. If the desired state is in the memory location, then the check may branch around the MWait instruction and continue with subsequent processing. The check may detect an update to the cache line that occurs in a race condition with the execution of the monitor instruction. In the example, the desired state is not present in the cache line and the processor core 18A executes the MWait instruction. The processor core 18A thus enters the sleep state (arrow 70).

The processor core 18B executes a store operation to the address A, and detects (in the monitor unit 28B) that the store operation's address matches the shadowed monitor address (MAddrS) from the processor core 18A. Accordingly, the processor core 18B (and more particularly the monitor unit 28B) signals the processor core 18A (and more particularly the monitor unit 26A) by asserting the Wakeup-ST signal (arrow 72). The processor core 18A checks the address A again (Check [A] in FIG. 6) and detects the desired state in the cache line. Thus, the processor core 18A continues execution with other instructions.

Figure 7:
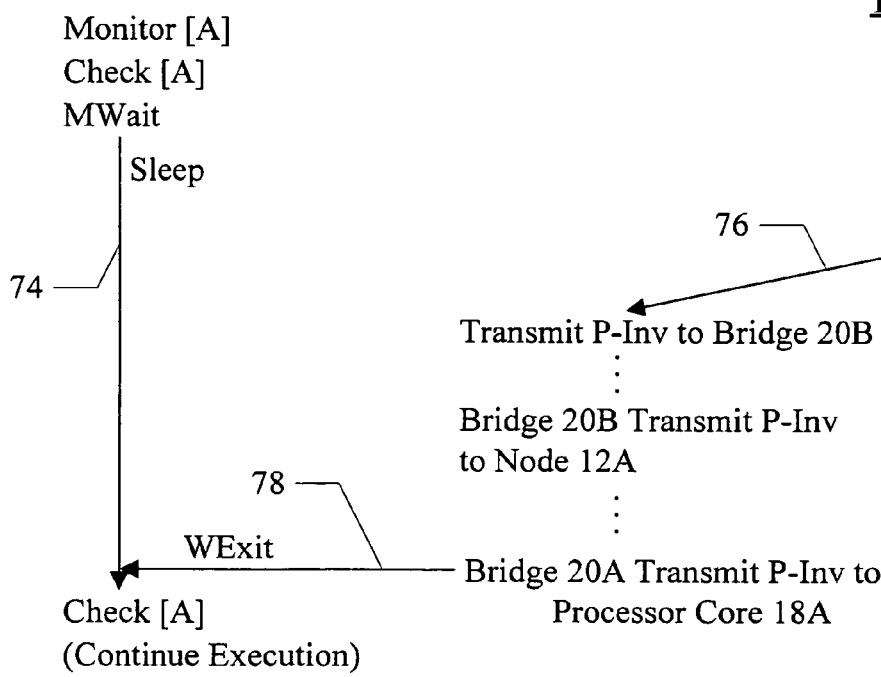
FIG. 7 is an example illustrating operation of one embodiment of a processor core when a processor core in the another node updates the monitored cache line.

FIG. 7 is an example illustrating operation of the processor core 18A when a processor core in another node 12B (e.g. the processor core 18C) updates the monitored cache line. Code being executed by the processor core 18A is shown beneath the heading (in bold) "Processor Core 18A, Node 12A". Code being executed by the processor core 18C is shown beneath the heading (in bold) "Processor core 18C, Node 12B". Additionally, transmission of communications between the processor core 18C and the processor core 18A are shown in the middle in FIG. 7. Similar to the example of FIG. 6, the processor core 18A executes the monitor instruction, establishing the address "A" of a cache line for monitoring and arming the monitor unit 26A; checks the address "A"; and executes the MWait instruction. The processor core 18A thus enters the sleep state (arrow 74).

The processor core 18C executes a store operation to the address A. In the present embodiment, the processor core 18C does not have a shadow copy of the address being monitored by the processor core 18A, and thus continues with the normal transmission of coherency operations to complete the store. Particularly, the processor core 18C transmits an invalidating probe to the bridge 20B in the node 12B (arrow 76). The bridge 20B subsequently transmits the invalidating probe to the node 12A (and it arrives in the bridge 20A). The bridge 20A subsequently transmits the invalidating probe to the processor core 18A, which detects that the address of the invalidating probe matches the address in the register 28A. Thus, the processor core 18A exits the sleep state (arrow 78). The processor core 18A checks the address A again (Check [A] in FIG. 7) and detects the desired state in the cache line. Thus, the processor core 18A continues execution with other instructions.

Numerous variations and modifications will become apparent to those skilled in the art once the above disclosure is fully appreciated. It is intended that the following claims be interpreted to embrace all such variations and modifications.

What is claimed is:

1. A system comprising:
    a first processor core configured to communicate an address range indication identifying an address range that the first processor core is monitoring for an update, wherein the first processor core is configured to communicate the address range indication responsive to executing a first instruction defined to cause the first processor core to monitor the address range for update; and
    a second processor core coupled to receive the address range indication and configured, responsive to executing a store operation that updates at least one byte in the address range, to signal the first processing core, and wherein the second processor core is configured to issue one or more coherency communications to coherently perform the store operation; and
    wherein the first processor core is coupled to receive the signal from the second processor core prior to receiving the one or more coherency communications issued by the second processor core to coherently perform the store operation, and wherein the first processor core is configured to exit a first state in which the first processor core is awaiting the update in the address range, the first processor core configured to exit the first state responsive to the signal from the second processor core.

2. The system as recited in claim 1 wherein the address range indication comprises an address identifying a block of contiguous memory bytes.

3. The system as recited in claim 2 wherein the block contiguous memory bytes is a cache line.

4. The system as recited in claim 1 wherein the first processor core is coupled to an interface to communicate with other components of the computer system, and wherein the first processor core is further configured to exit the first state responsive to receiving an indication of update from the interface if the indication of update indicates an update in the address range.

5. The system as recited in claim 4 wherein the indication of update is a probe.

6. The system as recited in claim 1 wherein the first processor core comprises a first register configured to store the address range indication.

7. The system as recited in claim 6 wherein the second processor core comprises a second register configured to store a shadow copy of the address range indication.

8. The system as recited in claim 1 wherein the first state comprises a power conservation state.

9. A method comprising:
    communicating, from a first processor core to a second processor core, an address range indication identifying an address range that the first processor core is monitoring for an update, wherein the communicating is responsive to executing a first instruction in the first processor core that is defined to cause the first processor core to monitor the address range for update;
    executing a store operation that updates at least one byte in the address range in the second processor core;
    issuing one or more coherency communications from the second processor core to coherently perform the store operation;
    responsive to the store operation, signalling the first processor core; and
    in the first processor core, exiting a first state, in which the first processor core is awaiting the update in the address range, wherein the exiting is responsive to the signalling and occurs prior to receiving the one or more coherency communications issued by the second processor core to coherently perform the store operation.

10. The method as recited in claim 9 wherein the address range indication comprises an address identifying a block of contiguous memory bytes.

11. The method as recited in claim 10 wherein the block contiguous memory bytes is a cache line.

12. The method as recited in claim 9 wherein the first processor core is coupled to an interface to communicate with other components of the computer system, the method further comprising exiting the first state in the first processor core responsive to receiving an indication of update from the interface if the indication of update indicates an update in the address range.

13. The method as recited in claim 12 wherein the indication of update is a probe.

14. The method as recited in claim 9 wherein the first state comprises a power conservation state.

15. A processor core comprising a monitor unit configured to monitor an address range for update responsive to a first instruction, wherein the processor core is configured to enter a first state to await the update to the address range, and wherein the monitor unit is configured to communicate an address range indication identifying the address range to a second processor core responsive to executing the first instruction, and wherein the monitor unit is configured to receive a signal from the second processor core indicating that the second processor core is updating at least one byte in the address range, and wherein the processor core is coupled to receive the signal prior to receiving one or more coherency communications issued by the second processor core to coherently perform the store operation, and wherein the processor core is configured to exit the first state responsive to the signal.

16. The processor core as recited in claim 15 wherein the address range indication comprises an address identifying a block of contiguous memory bytes.

17. The processor core as recited in claim 16 wherein the block contiguous memory bytes is a cache line.

18. The processor core as recited in claim 15 further having an interface to communicate with other components of the computer system, and wherein the processor core is further configured to exit the first state responsive to receiving an indication of update from the interface if the indication of update indicates an update in the address range.

19. The processor core as recited in claim 18 wherein the indication of update is a probe.

20. The processor core as recited in claim 15 wherein the monitor unit comprises a first register configured to store the address range indication.

21. The processor core as recited in claim 20 wherein the monitor unit further comprises a second register configured to store a shadow copy of a second address range indication received from the second processor core, wherein the second processor core is monitoring for an update in a second address range indicated by the second address range indication.

22. The processor core as recited in claim 21 wherein the monitor unit, responsive to the processor core executing a second store operation updating at least one byte in the second address range, is configured to signal the second processor core.

23. The processor core as recited in claim 15 wherein the first state comprises a power conservation state.

24. The processor core as recited in claim 23 wherein the processor core is configured to enter the first state responsive to executing a second instruction.

25. The system as recited in claim 4 wherein the second processor core is coupled to signal the first processor core separate from the interface.

26. The system as recited in claim 8 wherein the first processor core is configured to enter the power conservation state responsive to executing a second instruction that indicates that the first processor core is to wait for the update in the address range.

27. The processor core as recited in claim 18 wherein the processor core is coupled to receive the signal separate from the interface.

* * * * *